United States Patent [19]
Thatcher

[11] 3,967,214
[45] June 29, 1976

[54] STABILIZING ELECTRODE FOR COLD CATHODE GAS-ION LASER

[75] Inventor: John B. Thatcher, Cupertino, Calif.
[73] Assignee: Holosonics, Inc., Richland, Wash.
[22] Filed: Jan. 29, 1975
[21] Appl. No.: 545,177

[52] U.S. Cl............................................ 331/94.5 PE
[51] Int. Cl.² ............................................ H01S 3/09
[58] Field of Search..................... 331/94.5; 330/4.3

[56] References Cited
UNITED STATES PATENTS 3,497,827  2/1970  Smith et al................... 331/94.5 PE
3,792,372  2/1974  Mark........................... 331/94.5 PE

*Primary Examiner*—William L. Sikes
*Attorney, Agent, or Firm*—Wells, St. John & Roberts

[57] ABSTRACT

A cold cathode gas-ion laser is described having a stabilizing electrode positioned adjacent the cathode to increase the discharge field strength adjacent the cathode to increase the life span and reliability of the laser during high performance operating conditions.

7 Claims, 3 Drawing Figures

STABILIZING ELECTRODE FOR COLD CATHODE GAS-ION LASER

BACKGROUND OF THE INVENTION

This invention relates to gas-ion lasers and more particularly to cold (non-electrically heated) cathode gas-ion lasers.

Prior art cold cathode type gas-ion lasers such as those described in U.S. Pat. No. 3,555,451 granted Jan. 12, 1971, are used to pulse gas-ion lasers which operate reliably for approximately 1000 hours at pulse repetition rates up to 60 Hz. with pulse durations of $6 \times 10^{-6}$ seconds at peak multimode power output of 6 watts, and average multimode power output of 2 milliwatts. If the pulse rate or the power output of the laser is increased, the life span of the laser generally decreases. As an example, if the pulse duration is increased to $50 \times 10^{-6}$ seconds thereby increasing the average light output power to 16 milliwatts, the usable life of the laser drops to approximately 100 hours.

It has been observed that prior art lasers operating at pulse durations of $50 \times 10^{-6}$ seconds and 16 milliwatts average multimode light power output often begin to miss pulses randomly but with increasing frequency after only 80 hours of operation and often fail completely after as little as 100 hours of operation.

One of the principal objects of this invention is to provide a high performance pulsed gas-ion laser of the cold cathode type that has a considerably greater operating life span with increased reliability.

An additional object of this invention is to provide a pulsed gas-ion laser with a cold cathode capable of high pulse repetition rates at pulse durations of at least $50 \times 10^{-6}$ seconds or greater and at average power levels of at least 16–20 milliwatts or greater with reliable operating lifetimes of 1,000 hours or greater.

A further object of this invention is to provide a cold cathode ion gas laser with increased lifetime and capability that can be readily manufactured without greatly increasing the costs of the unit.

These and other objects and advantages of this invention will become apparent upon reading the following detailed description of preferred and alternate embodiments.

A preferred embodiment and one alternate embodiment of this invention have been chosen for purposes of illustration and description. Such embodiments are not intended to be exhaustive nor to limit the invention to the precise form disclosed. They are chosen and described in order to best explain the principles of the invention, and their application in practical use to thereby enable others skilled in the art to best utilize the invention in various embodiments and modifications as are best adapted to the particular use contemplated. As various changes may be made in form, construction and arrangement of components herein without departing from the spirit and scope of the invention and without sacrificing any of the advantages, it is to be understood that all matter herein is to be interpreted as illustrative and not as limiting the applicant's invention.

BRIEF DESCRIPTION OF THE DRAWINGS

A preferred embodiment and one alternate embodiment of this invention are illustrated in the accompanying drawings, in which.

DETAILED DESCRIPTION OF THE PREFERRED AND ALTERNATE EMBODIMENT

Figure 1:
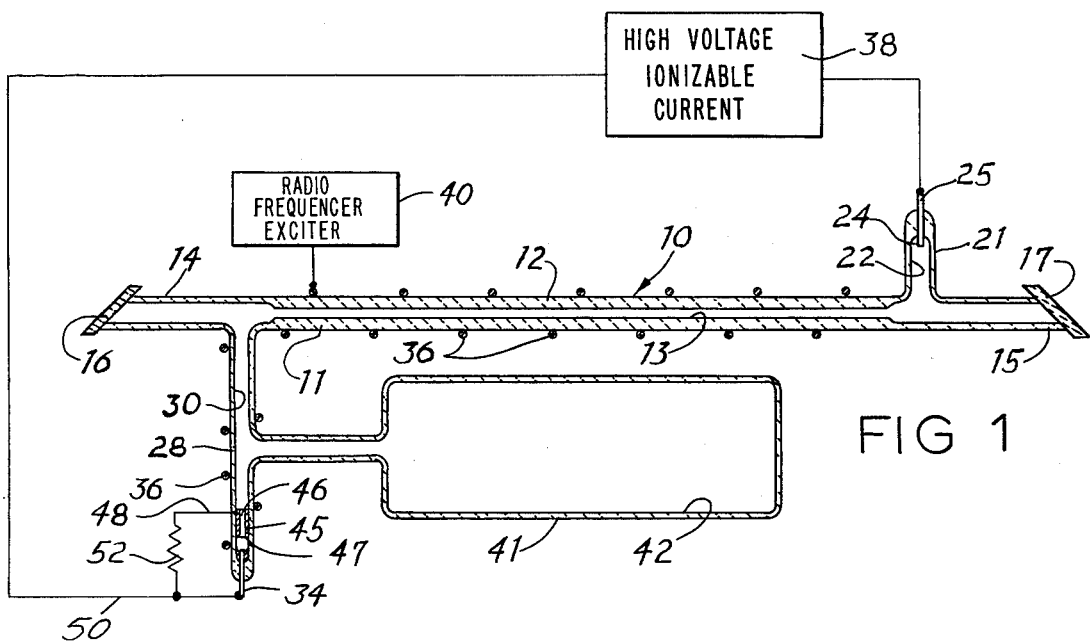
FIG. 1 is a schematic diagram of a cross-section of a cold cathode gas-ion laser embodying the principal features of this invention.

Referring in more detail to the drawings, there is illustrated in FIG. 1 a gas-ion laser 10 for producing a monochromatic coherent light beam. The general principles of the gas-ion laser are generally well known and shall not be dealt with with any degree of detail. Generally the gas-ion laser includes an electrically/insulative envelope or housing 11 made of glass, quartz or ceramic material. Samples of various types of envelopes or housing materials are illustrated in U.S. Pat. Nos. 3,450,497; 3,555,451; 3,492,596; 3,699,470 and 3,721,716. The envelope 11 includes a main elongated discharge body or tube 12 having a longitudinal axis. The main discharge body or tube has an elongated discharge cavity 13 extending between ends 14 and 15 of the main discharge tube 12. The cavity 13 is filled with an ionizable gas. Most lasers include an ionizable gas or mixture thereof such as argon, helium, neon, xenon, krypton. Additionally, other types of ionizable gases may be utilized such as nitrogen, oxygen, sulfur hexafluoride, carbon monoxide and carbon dioxide. However it should be noted that this invention is not limited to any particular gas or group of ionizable gases or envelope material.

The tube 12 terminates in ends 14 and 15 having planar windows 16 and 17 respectively that are positioned at an angle with respect to the axis of the laser tube known as the Brewster angle.

The envelope 11 includes a branch recess or lateral extension 21 adjacent end 15 forming an anode cavity 22 in open communication with cavity 13. An anode electrode 24 is mounted in the branch cavity 22 spaced laterally from the main discharge tube 12. The anode has a surface in contact with the ionizable gas. The anode electrode 24 has an electrical lead 25 extending from the exterior of the envelope.

The envelope further includes a branch recess or lateral extension 28 adjacent end 14 forming a cathode cavity 30 in open communication with the main cavity 13. A cathode electrode 32 is mounted in the cathode cavity 30 having a surface in contact with the ionizable gas. The cathode electrode 32 has an electrical lead 34 extending from the envelope.

Additionally, the laser 10 has an exciter or trigger electrode 36 for triggering the laser discharge. The electrode 36, as illustrated includes a conductive wire that is wound about the envelope between the cathode and anode. Alternatively, the electrode 36 may be made of a metallic coating or of sheet metal such as disclosed in U.S. Pat. No. 3,688,217.

A high voltage ionizable current source 38 is electrically connected between the anode lead 25 and the cathode lead 34 for supplying high voltage current to the laser to ionize the gas. The source 38 may be variable to control the power level and pulse duration of the laser beam to values above 16–20 milliwatts power output and greater than $20$–$50 \times 10^{-6}$ pulse durations.

A radio frequency exciter source 40 is connected to the exciter or trigger electrode 36 for controlling the pulsation of the laser. The source 40 applies a 10 kv to 20 kv radio frequency pulse to the electrode 36. The frequency of the pulse may be varied to rates greater than 30 Hz.

In addition, the laser has a reservoir 41 containing a cavity 42 having a rather large diameter in comparison to the laser tube. The gas in the reservoir 41 maintains the laser gas pressure rather constant and replenishes the gas in the cavity 13 to prolong the life of the laser. Generally the reservoir 41 has an increased volume to surface ratio to minimize or reduce the amount of pressure lost due to the fusion of the gas through the reservoir. As shown in the drawings, the reservoir is connected to and in open communication with the cathode cavity 30.

As previously mentioned, the applicant has found that prior art cold cathode, gas-ion lasers have greater reduced operating lives when operated at significantly increased power levels. It has been found upon examination, that the surface-work-function of the cathode is substantially increased when the prior art lasers are operated at the higher power levels for prolonged periods of time.

To overcome this problem, the applicant has found that a substantially increased life may be obtained by mounting a stabilizing electrode 45 near the cathode to increase the discharge field strength immediately adjacent the cathode. During the laser discharge, the voltage potential between the anode electrode and cathode electrode gradually decreases from the anode through the luminous discharge positive column or plasma with more than 50% of the discharge potential dropping or falling sharply from the termination of the discharge positive column to the cathode. The sharp drop of the discharge potential adjacent the cathode is referred to in the art as the "cathode fall". The cathode fall represents the potential through which the positive gaseous ions "fall" in passing from the positive column to the cathode. The magnitude of the cathode fall is equal to the minimum value of the breakdown voltage for the particular laser gas and the cathode material. The distance covered by the cathode fall generally varies with the gas pressure. Generally the distance over which the cathode fall occurs is less than one tenth of the total distance between the anode and cathode.

The applicant has found that by placing the stabilizing electrode in contact with the laserable gas between the termination of the positive column and the cathode that the reliable operable life of the laser may be increased significantly even though the laser is operated at the higher power levels. Applicant has found that the stabilizing electrode permits the laser to be operated reliably for 1,000 hours or longer at high pulse repetition rates greater than 30 Hz at pulse durations of $20-50 \times 10^{-6}$ seconds or greater and at average power levels of 16-20 milliwatts or greater.

Figure 3:
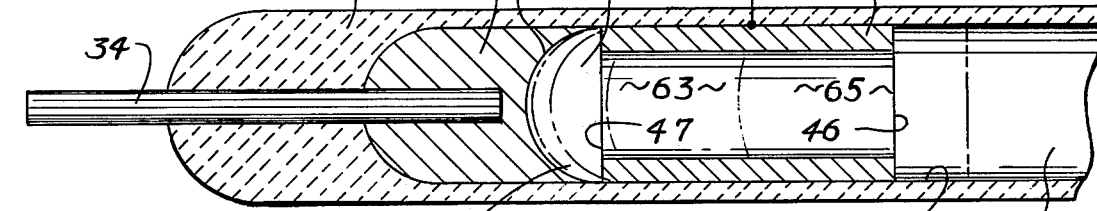
FIG. 3 is an enlarged schematic diagram illustrating various regions that appear adjacent the cathode during discharge of the laser.

Between the positive column and the cathode there are various discharge light and dark regions. As illustrated in FIG. 3 during discharge, there is a very narrow dark region next to the cathode surface known as the Aston dark space region 60. Immediately adjacent to and in communication with the Aston dark space is a luminous region known as the cathode glow region 61. Next to the cathode glow region is a region known as the Crookes dark space region 62. The Crookes dark space is also known as the cathode dark space or the Hifford dark space. Adjacent to the Crookes dark space region 62 is a luminous region known as the negative glow region 63, which starts quite abruptly and gradually fades into a region known as the Faraday dark space region 65. The Faraday dark space region 65 merges into the luminous positive column or plasma 67. In the preferable form of this invention, the stabilizing electrode is positioned between the cathode and positive column with at least a portion of the electrode 45 extending into the cathode glow region 61.

In the preferable embodiment, as shown in FIG. 1, the stabilizing electrode 45 has a cylindrical shape between ends 46 and 47. The electrode 45 has an electrical lead 48 extending through the envelope. The electrode 45 is mounted in contact with laserable gas within the cathode cavity 30 coaxially in relation with the cathode electrode 32.

In the preferred embodiment, the electrical lead is connected through line 50 to the cathode lead 34. A high resistive load 52 is mounted in line 50 to stabilize the electrode 45 and to prevent large current flows through the electrode 45. In the preferred embodiment, the load 52 is selected having a resistive value considerably greater than the discharge resistance between the anode and the cathode. Preferably load 52 is a resistor of 500–1,000 ohms. When the source 40 fires, the field strength between electrode 45 and the cathode 32 is greater than between the cathode 32 and the anode 24 causing an initial arc between the cathode 32 and the stabilizing electrode 45. The arc quickly expands to the anode 24 with most of the discharge current passing through the anode 24. The increased initial surface-work-function of the cathode that may be present because of the higher operating power levels.

Figure 2:
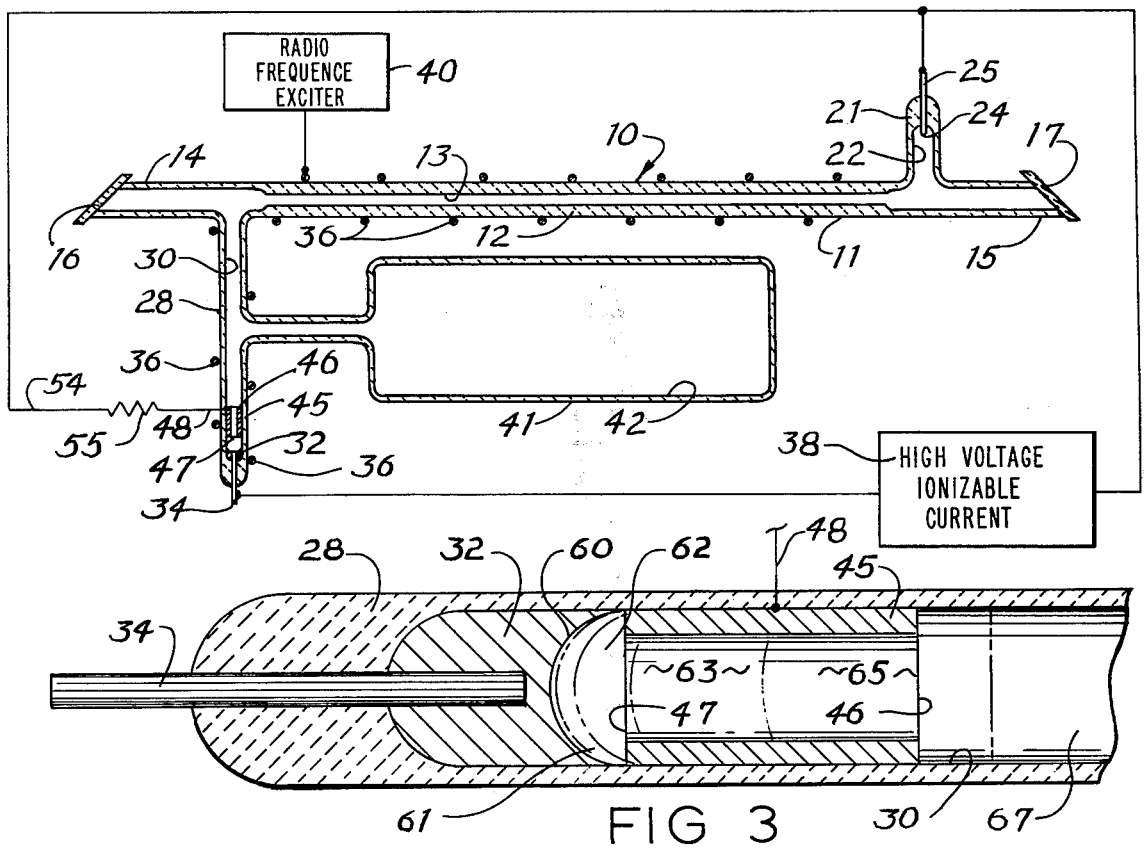
FIG. 2 is a schematic diagram illustrating cross-section of a cold cathode gas-ion laser embodying an alternate form of this invention.

In the alternate embodiment illustrated in FIG. 2, the electrical lead 48 of the stabilizing electrode 45 is connected through a line 54 having a load 55 to the anode lead 25. In such an arrangement, it is desirable and preferred to have a load 55 consisting of a resistor with a value of between 1,500–2,500 ohms.

One may reasonably expect that a suitable combination of capacitors, inductances and resistances may be substituted for the resistor loads 52 and 55 to realize the same or further improvements in performance.

It should be understood that other variations of the applicant's invention are possible and that the above-described embodiments of practicing this invention are presented as examples only and are not intended to limit the true scope of this invention as defined by the following claims.

What is claimed is:

1. In a cold cathode gas-ion laser having an envelope containing a laserable gas with spaced primary discharge electrodes in communication with the laserable gas consisting of an anode and a cathode and having an exciter electrode to initiate the gaseous discharge of the laser:

a stabilizing electrode contacting the laserable gas adjacent the cathode;
   said stabilizing electrode being operatively electrically connected to one of the primary discharge electrodes through a load to increase the electrical field strength of the laser adjacent the cathode during the gas discharge of the laser.

2. In the laser as defined in claim 1 wherein the laser during the gaseous discharge establishes a luminous positive column between the anode and cathode terminating short of the cathode wherein the stabilizing electrode contacts the laserable gas between the termination of the luminous positive column and the cathode.

3. In the laser as defined in claim 1, wherein the laser during the gas discharge has a cathode glow region adjacent the cathode and wherein the stabilizing electrode contacts the laserable gas in the cathode glow region.

4. In the laser as defined in claim 3 wherein the stabilizing electrode has a cylindrical shape with one end extending into the cathode glow region.

5. In the laser as defined in claim 1 wherein the load is a resistor.

6. In the laser as defined in claim 1 wherein the load is a resistor having a resistance value between 1,500 and 2,500 ohms.

7. In the laser as defined in claim 1 wherein said load is a resistor having a resistance value between 500 and 1,500 ohms.

* * * * *